(12) United States Patent
Hui et al.

(10) Patent No.: US 9,807,621 B1
(45) Date of Patent: Oct. 31, 2017

(54) DISTRIBUTED CHANNEL SAMPLING ACROSS A MESH NETWORK

(71) Applicant: Google Inc., Mountain View, CA (US)

(72) Inventors: Jonathan Wing-Yan Hui, Belmont, CA (US); Martin A. Turon, Berkeley, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 15/157,149

(22) Filed: May 17, 2016

(51) Int. Cl.
*H04W 40/24* (2009.01)
*H04W 16/16* (2009.01)
*H04W 84/20* (2009.01)
*H04W 24/10* (2009.01)
*H04W 24/08* (2009.01)
*H04B 17/318* (2015.01)
*H04W 84/12* (2009.01)
*H04W 4/00* (2009.01)

(52) U.S. Cl.
CPC .......... *H04W 16/16* (2013.01); *H04B 17/318* (2015.01); *H04W 24/08* (2013.01); *H04W 24/10* (2013.01); *H04W 84/20* (2013.01); *H04W 4/008* (2013.01); *H04W 84/12* (2013.01)

(58) Field of Classification Search
CPC . H04B 16/16; H04B 17/318; H04W 52/0229; H04W 16/14; H04W 24/08; H04W 24/10; H04W 40/246; H04W 84/18; H04W 84/20; H04W 72/085
See application file for complete search history.

(56) References Cited

U.S. PATENT DOCUMENTS

| 9,386,480 | B2 * | 7/2016 | Papa | H04W 28/10 |
| 2016/0066249 | A1 * | 3/2016 | Dukes | H04W 40/246 370/255 |
| 2016/0191357 | A1 * | 6/2016 | Orner | H04L 41/12 370/328 |
| 2016/0316394 | A1 * | 10/2016 | Papa | H04W 28/10 |

* cited by examiner

*Primary Examiner* — Thanh Le
(74) *Attorney, Agent, or Firm* — Colby Nipper

(57) ABSTRACT

In embodiments of distributed channel sampling across a mesh network, a commissioning device propagates a scanning request, which includes a number of scanning parameters, to nodes in a mesh network, causing the nodes to perform energy detection (ED) scans using the scanning parameters. The commissioning device receives energy measurements in scanning reports from the nodes and analyzes the measurements to determine an operating channel for the mesh network. The commissioning device updates the operating channel in network configuration information that is sent to a leader device in the mesh network, for propagation to the mesh network.

28 Claims, 9 Drawing Sheets

US 9,807,621 B1

DISTRIBUTED CHANNEL SAMPLING ACROSS A MESH NETWORK

BACKGROUND

Wireless mesh networking used to connect devices to each other, and to cloud-based services, is increasingly popular for sensing environmental conditions, controlling equipment, and providing information and alerts to users. These wireless mesh networks may share radio spectrum with other wireless radio systems, and operate in radio bands under unlicensed or license-free regulatory regimes. For example wireless local area network (WLAN) technologies, such as Wi-Fi, share radio spectrum with wireless personal area network (WPAN) technologies, such as IEEE 802.15.4. The various radio systems that share spectrum are designed to accept interference from each other, as specified in the various regulatory regimes. Some wireless systems and standards are designed to evaluate noise, energy, and/or interference in radio channels, in order to determine the best frequency or frequencies on which to start a mesh network. However a mesh network device, such as a ZigBee coordinator, may only scan radio channels when starting a network, and is only able to measure energy within the operating range of its receiver. However a mesh network may cover a much larger area than the coordinator can evaluate by itself, and other radio signals may appear and disappear in the operating area of the mesh network over time that were not be present when the coordinator started the network.

SUMMARY

This summary is provided to introduce simplified concepts of distributed channel sampling across a mesh network. The simplified concepts are further described below in the Detailed Description. This summary is not intended to identify essential features of the claimed subject matter, nor is it intended for use in determining the scope of the claimed subject matter.

Distributed channel sampling across a mesh network is described, as generally related to evaluating energy in radio channels across a mesh network. In embodiments, a commissioning device can propagate a scanning request, which includes a number of scanning parameters, to nodes in a mesh network, causing the nodes to perform energy detection scans using the scanning parameters. The commissioning device receives energy measurements in scanning reports from the nodes and analyzes the measurements to determine an operating channel for the mesh network. The commissioning device updates the operating channel in network configuration information that is sent to a leader device in the mesh network, for propagation to the mesh network.

In aspects of distributed channel sampling across a mesh network, a mesh networking device receives a scanning request, which includes a number of scanning parameters. The mesh networking device performs an energy detection scan according to the received scanning parameters and transmits a scanning report that includes the energy measurements made during the energy detection scan. In other aspects, mesh network nodes can perform channel scans and a commissioning device propagates a scanning request, which includes a number of scanning parameters, to the mesh network nodes, causing the mesh network nodes to perform energy detection scans using the scanning parameters. The commissioning device receives energy measurements in scanning reports from the mesh network nodes and analyzes the measurements to determine an operating channel for the mesh network. The commissioning device updates the operating channel in network configuration information that is sent to a leader device in the mesh network, for propagation to the mesh network nodes.

BRIEF DESCRIPTION OF THE DRAWINGS

Embodiments of distributed channel sampling across a mesh network are described with reference to the following drawings. The same numbers are used throughout the drawings to reference like features and components.

DETAILED DESCRIPTION

Figure 1:
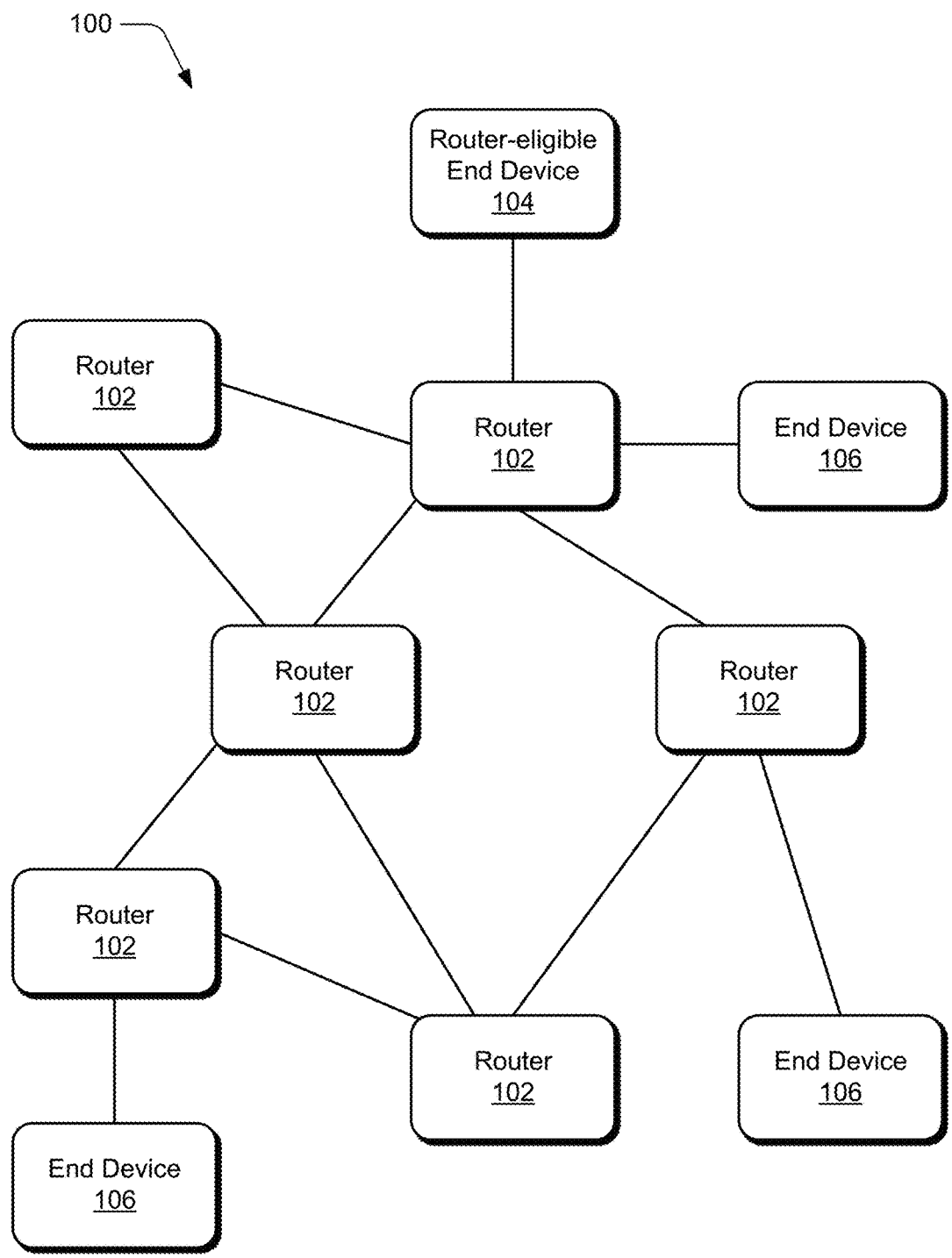
FIG. 1 illustrates an example mesh network system in which various embodiments of the distributed channel sampling across a mesh network can be implemented.

While features and concepts of the described systems and methods for the distributed channel sampling across a mesh network can be implemented in any number of different environments, systems, devices, and/or various configurations, embodiments of the distributed channel sampling across a mesh network are described in the context of the following example devices, systems, and configurations. Further, although examples of distributed channel sampling across a mesh network are described with respect to IEEE 802.15.4, the techniques described herein apply equally to any radio system and/or wireless network.

Mesh networks are often implemented using Wireless Personal Area Network (WPAN) technologies, such as IEEE 802.15.4, that operate using radio spectrum shared by other WPANs, as well as other radio systems. When a new WPAN is formed by a device implemented as a coordinator of the network, the coordinator performs an energy detection scan of the available radio channels to determine a channel on which to start the WPAN. The energy detection scan measures the amount of energy detected on each radio channel and the coordinator chooses a radio channel for the WPAN. Typically, the coordinator chooses the channel with the lowest detected energy from the energy detection scan. All the nodes in the mesh network then communicate on the channel selected by the coordinator.

One advantage of mesh networks is that a mesh network can use low power radios in multiple mesh network nodes to cover an area larger than the area covered by a single radio link, by routing messages through multiple nodes between a source node and a destination node. However, when a WPAN coordinator performs an energy detection scan, the energy that is detected is limited by the sensitivity of the radio in the coordinator. The energy detection scan provides the coordinator information about its immediate environment, but not about the entire area the mesh network covers. There may be mesh network nodes that are exposed to different radio conditions than the coordinator experiences during or after the energy detection scan. For example, a mesh network node may be several hops away from the coordinator and adjacent to a Wi-Fi access point in a home. If the coordinator chooses a channel that overlaps, or is adjacent to, the radio spectrum used by the Wi-Fi access point, the mesh network nodes close to the Wi-Fi access point may experience channel impairments, such as receiver desensitization, packet loss, excessive retries, and so forth.

Distributed channel sampling across a mesh network provides a flexible framework for a network coordinator configuring nodes in a mesh network to assess the quality of available radio channels for the mesh network, across the entire coverage area of the mesh network. Each mesh network node receives a scan request message that includes scanning parameters. The scanning parameters include a channel mask that indicates which channels to scan, and parameters indicating how many times, how long, and/or when to scan the channels indicated in the channel mask. By configuring multiple nodes in the mesh network to perform channel scans, a better, global selection of a channel for the mesh network can be made than by simply basing the channel selection on localized conditions at the coordinator.

Additionally, a commissioning device can send the scan request to the mesh network nodes using efficient multicast and/or broadcast communications in the mesh network. The mesh network nodes can respond with scanning reports when the scans are completed according to the scanning parameters. By using efficient distribution techniques, network overhead for channel scanning is reduced over individual command and response requests to individual nodes, to perform on-demand channel scans.

Further, the commissioning device can configure nodes in the mesh network for periodic scanning over time to assess changing conditions that affect the mesh network over time. The one-time energy detection scan by a coordinator, when a mesh network is formed, is only reflective of radio conditions at a single instant in time. Parameters distributed to the mesh network nodes can schedule periodic scanning of the radio channels to assess on-going radio conditions across the mesh network. This periodic scanning enables the mesh network to adjust its operating channel and/or frequency band to maintain optimal radio conditions over the life of the mesh network.

Distributed channel sampling across a mesh network can also reduce the complexity of managing radio configurations for a user by forwarding the results of channel scans from the commissioning device to a cloud service that analyses the scanning reports and recommends configuration changes to the user who manages the mesh network. The cloud service can provide network configuration changes, as well as scanning parameter changes to optimize the distributed channel sampling. The cloud service can provide configuration information directly to the user via the user's commissioning device and/or directly to mesh network nodes to configure the mesh network.

FIG. 1 illustrates an example mesh network system 100 in which various embodiments of the distributed channel sampling across a mesh network can be implemented. The mesh network 100 is a wireless mesh network that includes routers 102, a router-eligible end device 104, and end devices 106. The routers 102, the router-eligible end device 104, and the end devices 106, each include a mesh network interface for communication over the mesh network. The routers 102 receive and transmit packet data over the mesh network interface. The routers 102 also route traffic across the mesh network 100. The routers 102 and the router-eligible end devices 104 can assume various roles, and combinations of roles, within the mesh network 100, as discussed below.

The router-eligible end devices 104 are located at leaf nodes of the mesh network topology and are not actively routing traffic to other nodes in the mesh network 100. The router-eligible device 104 is capable of becoming a router 102 when the router-eligible device 104 is connected to additional devices. The end devices 106 are devices that can communicate using the mesh network 100, but lack the capability, beyond simply forwarding to its parent router 102, to route traffic in the mesh network 100. For example, a battery-powered sensor is one type of end device 106.

The routers 102, the router-eligible end device 104, and the end devices 106 include network credentials that are used to authenticate the identity of these devices as being a member of the mesh network 100. The routers 102, the router-eligible end device 104, and the end devices 106 also use the network credentials to encrypt communications in the mesh network.

Figure 2:
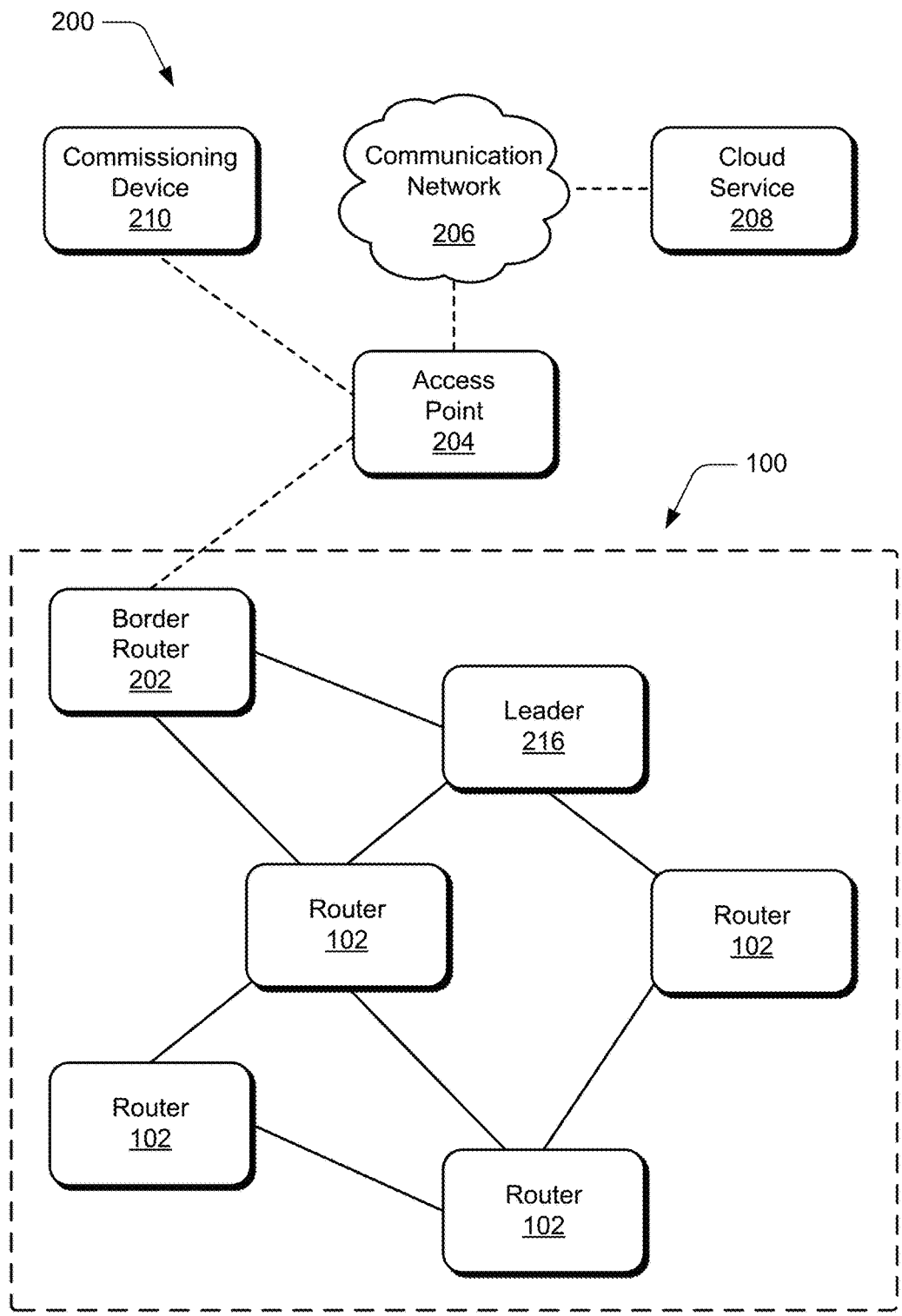
FIG. 2 illustrates an example environment in which various embodiments of the distributed channel sampling across a mesh network can be implemented.

FIG. 2 illustrates an example environment 200 in which various embodiments of the distributed channel sampling across a mesh network can be implemented. The environment 200 includes the mesh network 100, in which some routers 102 are performing specific roles in the mesh network 100. The devices within the mesh network 100, as illustrated by the dashed line, are communicating securely over the mesh network 100, using the network credentials.

A border router 202 (also known as a gateway and/or an edge router) is one of the routers 102. The border router 202 includes a second interface for communication with an external network, outside the mesh network 100. The border router 202 connects to an access point 204 over the external network. For example, the access point 204 may be an Ethernet router, a Wi-Fi access point, or any other suitable device for bridging different types of networks. The access point 204 connects to a communication network 206, such as the Internet. A cloud service 208, which is connected via the communication network 206, provides services related to and/or using the devices within the mesh network 100. By way of example, and not limitation, the cloud service 208 provides applications that include connecting end user devices, such as smart phones, tablets, and the like, to devices in the mesh network 100, processing and presenting data acquired in the mesh network 100 to end users, linking devices in one or more mesh networks 100 to user accounts of the cloud service 208, provisioning and updating devices in the mesh network 100, and so forth.

A user choosing to commission and/or configure devices in the mesh network 100 uses a commissioning device 210, which connects to the border router 202 via the external network technology of the access point 204, to commission and/or configure the devices. The commissioning device 210 may be any computing device, such as a smart phone, tablet, notebook computer, and so forth, with a suitable user interface and communication capabilities to execute applications that control devices to the mesh network 100. Only a single commissioning device 210 may be active (i.e., an active commissioner) on the mesh network 100 at time. The commissioning of mesh network devices is described in U.S. patent application Ser. No. 14/749,616 entitled "Mesh Network Commissioning" filed Jun. 24, 2015, the disclosure of which is incorporated by reference herein in its entirety.

One of the routers 102 performs the role of a leader 216 for the mesh network 100. The leader 216 manages router identifier assignment and the leader 216 is the central arbiter of network configuration information for the mesh network 100. The leader 216 propagates the network configuration information to the other devices in the mesh network 100. The leader 216 also controls which commissioning device is accepted as a sole, active commissioner for the mesh network 100, at any given time.

Figure 3:
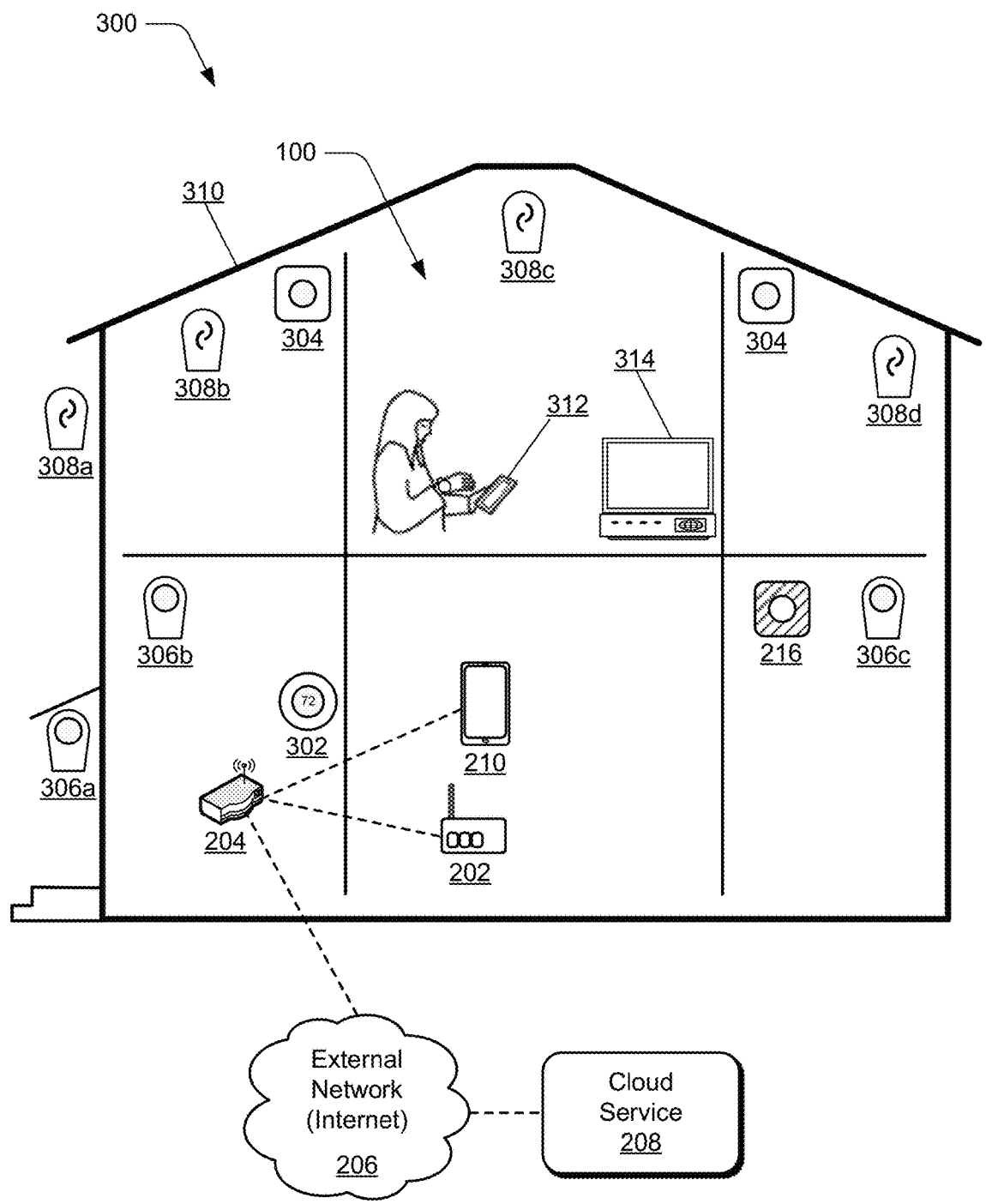
FIG. 3 illustrates various radio propagation characteristics that affect scanning and selection of radio channels for a mesh network.

FIG. 3 illustrates various radio propagation characteristics that affect the mesh network 100 in general, and the scanning and selection of radio channels for the mesh network 100, in particular. Generally, the environment 300 includes the mesh network 100 implemented as part of a smart-home or other type of structure with any number of mesh network devices that are configured for communication in a mesh network. For example, the mesh network devices can include a thermostat 302, hazard detectors 304 (e.g., for smoke and/or carbon monoxide), cameras 306a-306c (e.g., indoor and outdoor), lighting units 308a-308d (e.g., indoor and outdoor), and any other types of mesh network devices that are implemented inside and/or outside of a structure 310 (e.g., in a smart-home environment). In this example, the mesh network devices can also include any of the previously described devices, such as the border router 202, the commissioning device 210, and leader device 216, as well as any of the devices implemented as a router 102, and/or an end device 106.

When the mesh network 100 was established, the leader device 216 may have acted as an IEEE 802.15.4 coordinator and performed an energy detection scan to choose an operating channel for the mesh network 100. Over time, a user may add more mesh network devices to automate a number of new functions within the structure 310. Each of the various devices inside and outside the structure 310 will experience different radio frequency (RF) environmental characteristics based on the location of the device, other devices located around the device, and/or characteristics of the structure 310. Some of the RF characteristics that affect the RF environment may be relatively static, such as the attenuation of RF signals by walls in the structure 310. Other RF characteristics may vary over time due to the intermittent operation of radio devices in and around the structure 310, fast or slow fading of RF signals, the addition, and/or relocation of mesh network or other radio devices within the structure 310, and other sources of RF energy. For example, non-communication sources of RF energy, such as arc welding or industrial use of an Industrial, Scientific, and Medical (ISM) device, produce RF energy in the frequency bands used by WPANs and other unlicensed devices.

By way of example, the leader device 216 is located inside the structure 310 and is several rooms away from the access point 204. An energy detection scan performed by the leader device 216 may show some energy on channels that are occupied by Wi-Fi signals from the access point 204, but the energy detection scan results may also show a low enough energy level that the leader device 216 might choose to operate on a channel within, or near, the occupied bandwidth of the Wi-Fi signals. By way of contrast, the thermostat 302 is located on a wall just above a table, where the access point 204 is located. The camera 306b is also in the same room as the access point 204. Energy detection scans performed by the thermostat 302 and camera 306b will show significantly higher energy levels in mesh network channels within the occupied bandwidth of the Wi-Fi signal from the access point 204. Using the energy measurements from the thermostat 302 and camera 306b may lead to a different choice of a channel for the mesh network 100.

In another example, the location of a mesh network device inside or outside the structure 310 affects the RF environmental characteristics experienced by those devices. As discussed above, the camera 306b will show high energy levels in mesh network channels within the occupied bandwidth of the Wi-Fi signal from the access point 204. By way of contrast, the signals in an energy detection scan performed by camera 306a will be lower due to path loss attenuation as the Wi-Fi signal from the access point 204 travels through the building materials (sheathing, siding, sheetrock, etc.) that make up the exterior wall of the structure 310.

In another example, elevation affects the RF environmental characteristics experienced by the devices outside the structure 310. The lighting unit 308a is located high on the exterior of the structure 310 and is exposed to more RF signals and/or RF signals at a higher level than the camera 306a, which is mounted lower on the exterior, and may benefit from shielding and signal attenuation provided by adjacent structures and vegetation. The lighting unit 308a may also measure higher energy detection scan energy levels on some channels, than devices inside the structure 310. Selecting a channel based solely on energy detection scans of a device inside the structure 310 may result in the selection of a radio channel that may not be optimal or usable for the lighting unit 308a.

In another example, the use of wireless devices within a portion of the structure 310 may affect energy detection scans only in that portion of the structure 310 or only during periods of time when the wireless devices are in use. A user may be streaming movies from a wireless device 312 to a connected television 314. This activity may affect the energy levels of channels in a portion of the structure during the activity, such as at lighting unit 308c. If an energy detection scan is performed when the user is away at work or school, and the wireless device 312 and the television 314 are not is use, the energy that would be detected during the energy detection scan would be lower. By way of contrast, if the energy detection scan is performed when the user is home, and the wireless device 312 and the television 314 are in use, the detected energy would be higher on the channels that share the spectrum used for streaming. This energy detection scan may indicate that some mesh network channels, which appeared usable when the wireless device 312 and the television 314 were not is use, are not always usable for the mesh network 100.

These examples are not meant to be a compressive list of the RF environmental conditions that are addressed by distributed channel sampling across a mesh network and should not be taken as a limitation of the claimed invention. There are many other examples of effects that affect RF propagation, such as slow fading, fast fading, varying atmospheric conditions, intermodulation interference, and so forth.

To communicate available channels and identify an individual channel, a channel page identifier (e.g., a Channel Type-Length-Value (TLV)) encodes an identifier of a channel page and an identifier of a channel, for propagation within the mesh network 100. For example, IEEE 802.15.4 defines a number of channel pages that include channel numbers. IEEE 802.15.4 channel page zero includes twenty seven channels, sixteen channels that are available in the 2450 MHz band, ten channels that are available in the 915 MHz band, and one channel that is available in the 868 MHz band. Channel page zero defines the channels, as follows:

$F_c=868.3$ in megahertz, for k=0

$F_c=906+2$ (k−1) in megahertz, for k=1, 2, . . . , 10, and $F_c=2405+5$ (k−11) in megahertz, for k=11, 12, . . . , 26, where $F_c$ is the center frequency of a channel and k is the channel number.

In any given mesh network 100, devices may only support operation in a single frequency band or may be configurable to operate in multiple frequency bands. When scanning to select an operating channel for the mesh network 100, it may be desirable to identify the frequency bands each mesh network device supports. For example, each mesh network device includes a channel pages identifier (e.g., a Channel Pages TLV) that can be read to identify the set of channel page identifiers supported by the mesh network device. Identifying the available channel pages restricts scanning to only available channels within a band, or enables scanning across frequency bands outside the current operating frequency band to determine if communication conditions are better in another frequency band.

With the available channels known, energy detection scans may be configured for any number of the available channels in any of the available channel pages with a channel mask. For example, the channel mask (e.g., a Channel Mask TLV) includes channel mask entries that specify a channel page, a mask length, and a channel mask, for the channels that are to be scanned. The channel mask is a variable length bit mask that indicates the channels within the channel page that are selected for energy detection scans.

While a single energy detection scan can be requested each time that an energy detection scan is desired, a user may not have a commissioning device connected to the network constantly to request multiple energy detection scans over a period of time. Also, requesting every energy detection scan separately generates mesh network traffic that reduces the throughput of the mesh network 100 for other traffic and may reduce battery life for battery-powered mesh network devices.

A scan request message (e.g., a MGMT_ED_SCAN.ntf message) may be used to request that mesh network devices measure and report energy measurements on one or more channels. The scan request message includes the channel mask to specify channels for energy detection scans. The mesh network device receiving the scan request message performs energy detection scans on the specified channels.

The scan request message can include additional parameters to specify how to perform the energy detection scans. As an example, and not a limitation, the additional parameters include a scan count (e.g., a Count TLV), a delay period (e.g., a Period TLV), and/or a scan duration (e.g., a Scan Duration TLV). The scan count indicates the number of the energy detection scans to perform for each selected channel in the channel mask. The delay period indicates an amount of time to delay before beginning energy detection scans and/or to delay between successive energy detection scans. The scan duration identifies an amount of time over which to measure the energy on each channel in the energy detection scan.

In embodiments, other parameters in the scan request message are contemplated, such as parameters that indicate whether energy detection scans should be coordinated between mesh network devices or be uncoordinated, if energy detection scans should be triggered from an event, such as a router advertisement message or a localization beacon message, and/or that configure reporting options, such as reporting energy detection scan results to provide an initial scan result before all scans are complete, to report scan results immediately if an energy detection scan results in an interesting event (e.g., an unusually high energy on the channel currently used by the mesh network 100), and so forth.

For example, when servicing the scan request message, a mesh network device performs IEEE 802.15.4 energy detection scans using a single channel at a time. The number of the energy detection scans indicated in the scan count specifies the number of energy detection scan rounds. Each energy detection scan round consists of performing one energy detection scan for each channel, separated by the delay period.

In an embodiment, the scan request message is received from the commissioning device 210, when the commissioning device 210 is the active commissioner on the mesh network. If the mesh network device determines that, while performing energy detection scans to service the scan request message, the commissioner is no longer active on the network, which is indicated in the commissioner dataset, the mesh network device may stop servicing the scan request message.

The mesh network device reports the results of its energy detection (ED) scan in a scan report message (e.g., a MGMT_ED_REPORT.ntf message). The scan report message is unicast to the source of the scan request message that triggered the scan. Alternatively, the scan request message may include a destination address for the scan report message. For example, the scan report messages may be sent to a cloud-based service instead of the commissioning device 210 that sent the scan request message.

The scan report message includes the channel mask and an energy list (e.g., an Energy List TLV). The channel mask indicates the channels that have energy measurements reported in the energy list. The energy list includes a list of energy measurement values corresponding to the channels selected in the channel mask. With N selected channels in the channel mask, the first N entries in the energy list represent the first energy measurement values for the N channels from the first energy detection scan. The next N entries in the energy list represent the second energy measurement values for the N channels from the second energy detection scan, and so forth.

In embodiments, the scan report message may include metadata that is useful in interpreting the energy measurements. For example, configuration information for a mesh network device, such as antenna gain, antenna type, antenna beamwidth, antenna diversity, device orientation, measurement resolution, an indication of smoothing or averaging used for the measurements, energy detector type (e.g., peak detector, root-mean-square (RMS) detector), and so forth.

In embodiments, a mesh network device may not wait until all energy detection scans in the scan request message are complete before reporting the results of one or more of the energy detection scans. For example, a mesh network device with a limited amount of buffer capacity may report fewer energy measurements, more frequently, to avoid overflowing its limited buffer capacity by attempting to store all the results for the energy detection scans specified in the scan request message. In another example, a mesh network device may report energy measurements before completing all the results for the energy detection scans specified in the scan request message, such as to provide an earlier initial report of one or more of the first energy detection scans that are performed, to report an interesting or anomalous event such as a high energy level detected (e.g., an energy measurement that exceeds a threshold) on the current operating channel of the mesh network 100, and so forth.

The energy measurement values may be expressed in any appropriate units. For example, the energy measurement values may be expressed directly in any suitable measurement unit, for example dBm, dBµV, milliwatts, and so forth. Alternatively, the result of an energy detection scan measurement may be encoded to reduce the size of the payload required to report the energy measurement values. For example, an energy measurement value is evaluated to determine one of a set of measurement ranges into which the energy measurement value falls. The expected range of energy measurement values is divided into a number of bins that each covers a portion of the expected range. For example, bins may represent a 2 dB portion of the expected range for the energy measurements. Each bin is numbered using a value, such as an unsigned or integer value, which occupies less space in the energy list than the corresponding measurement value.

Alternatively, energy measurement values for the N channels may be represented statistically. For example, instead of returning the N sets of measurements, a statistical value of the multiple measurements may be returned. The statistical values may include any of minimum value, a maximum value, a mean value, a media value, a standard deviation, a count of energy detection scans performed, and so forth.

In embodiments, energy detection scans may be coordinated between mesh network devices or may be uncoordinated. For example, energy detection scans that are coordinated between the mesh network devices in the mesh network 100 (i.e., synchronized to occur at the same time) provide sets of energy measurements that are correlated in time across the physical, operational space of the mesh network 100. In another example, energy detection scans that are uncoordinated between devices in the mesh network 100 provide energy measurements at a greater number of different points in time, than coordinated measurements, and provide a more detailed temporal picture of the RF environment.

In embodiments, energy detection scans may be coordinated using various techniques. For example, energy detection scans may be scheduled to be performed at specific times by the mesh network devices in the mesh network 100. In another example, energy detection scans are coordinated by a triggering event. The triggering event can be a router advertisement message, a broadcast message, a localization beacon signal or message, a special transmission signal for triggering energy detection scans, and so forth.

In embodiments, coordinating energy detection scans with the triggering event enables energy detection scans to be used in various network analysis and troubleshooting applications. For example, a mobile device transmits one or more timestamped beacon messages that trigger energy detection scans. The devices in the mesh network 100, which receive a timestamped beacon message, perform an energy detection scan in response to receiving the timestamped beacon message. The mesh network devices that are triggered may include metadata with the energy measurements from the triggered energy detection scan, such as metadata identifying the timestamped beacon that triggered the energy detection scan and/or a received signal strength of the received beacon.

In an example application, a user moves the mobile device around to various locations (e.g., a grid of locations, various rooms in a building, etc.) to survey the RF environment by transmitting a beacon message to trigger an energy detection scan for each of the various locations that determines which mesh network devices received the beacon message and the energy measurements that were triggered by the beacon. In another example, the user may use the mobile device to transmit a number of beacon messages to trigger energy detection scans to troubleshoot variations in operating conditions or configurations of the mesh network 100 and/or other nearby wireless equipment. The user triggers an energy scan for each troubleshooting scenario, such as operating the other wireless equipment, disabling the other wireless equipment, moving one or more mesh network devices and/or the other wireless equipment, and so forth, to evaluate the cause and solution to the operational variance.

Figure 4:
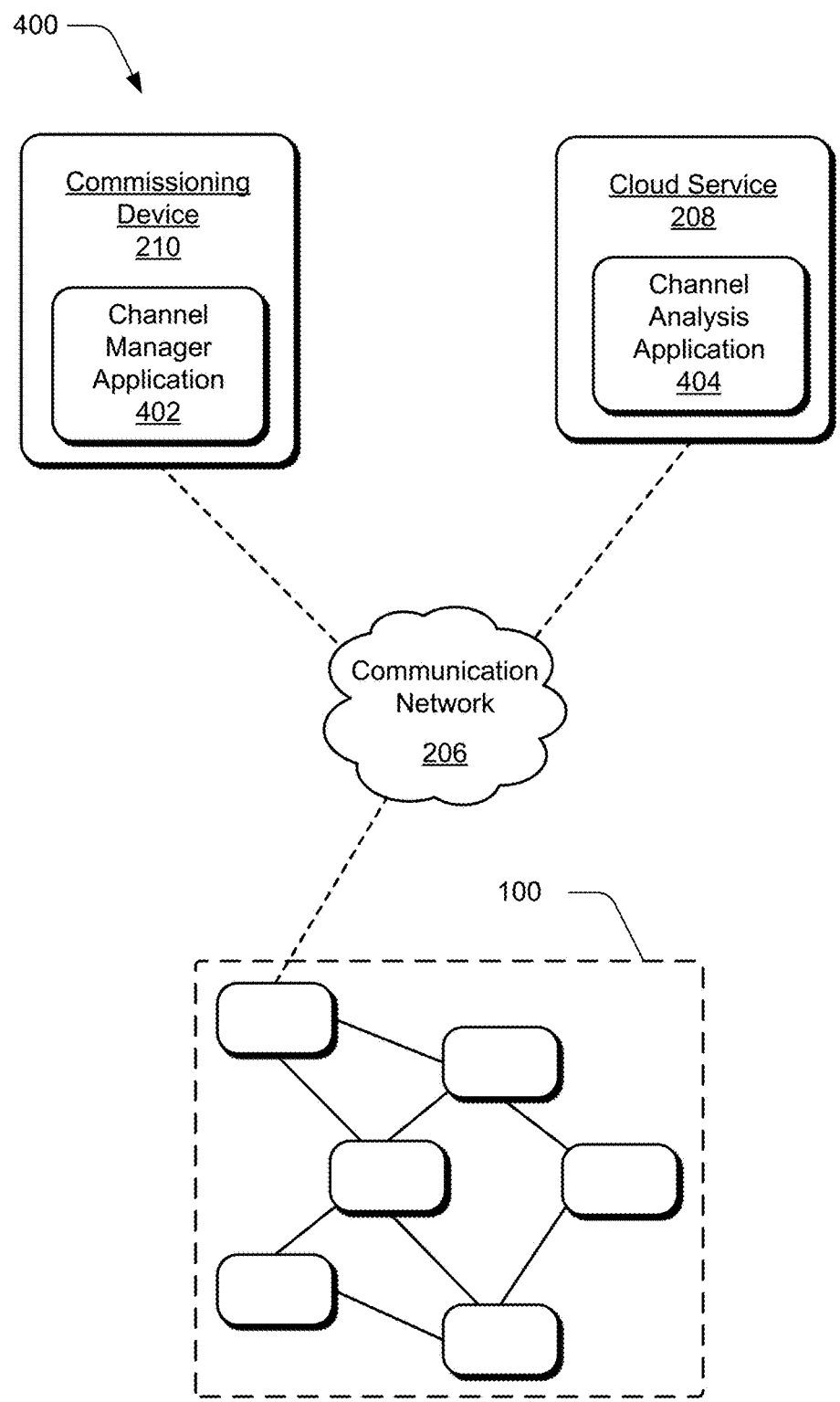
FIG. 4 illustrates an example embodiment in accordance with embodiments of the distributed channel sampling across a mesh network.

FIG. 4 illustrates example embodiments of the distributed channel sampling across a mesh network. In an embodiment, the commissioning device 210 is the active commissioner for the mesh network 100. The commissioning device 210 includes a channel manager application 402. When it is determined that energy detection scans should be performed in the mesh network 100, the channel manager application 402 sends the scan request message to mesh network devices in the mesh network 100. The mesh network devices perform energy detection scans as defined in the scan request message. The determination to initiate the energy detection scans may be initiated by the user, scheduled periodically, triggered by connectivity or performance issues, and/or done as part of joining a new mesh network device to the mesh network 100.

Each of the mesh network devices sends the results for completed energy detection scans to the commissioning device 210 in the scan report messages. The channel manager application 402 may directly analyze the results of the energy detection scans to determine if a change to a new channel and/or frequency band would improve performance for the mesh network 100. If a channel and/or frequency band change is indicated, the commissioning device 210 updates the network configuration information to indicate the change and sends the updated network information to the leader 216 in the mesh network 100. The leader 216 propagates the updated network information to the rest of the mesh network 100.

Alternatively, the channel manager application 402 may send the results of the energy detection scans to a channel analysis application 404 at the cloud service 208. The channel analysis application 404 analyzes the energy detection scans and sends a recommendation for the operating channel to the channel manager application 402. If a channel and/or frequency band change is indicated, the commissioning device 210 updates the network configuration information to indicate the change and sends the updated network information to the leader 216 in the mesh network 100. The leader 216 propagates the updated network information to the rest of the mesh network 100.

The channel manager application 402 and/or the channel analysis application 404 may maintain history from previous energy detection scans to improve analyzing the current energy detection scan to determine if a channel and/or frequency band change is appropriate. The channel analysis application 404 may also receive and aggregate energy detection scans performed by any number of other mesh networks, which can be used to refine the analysis of the current energy detection scan.

In an embodiment, configuration information about the devices in the mesh network 100 may be incorporated into analyzing energy detection scans. Known characteristics of different models of mesh network devices may be factored into the analysis, such as the type of radio chip in the device, antenna characteristics of the device, the manufacturer of the device, the version of radio firmware, and so forth.

Alternatively, the devices in the mesh network 100 may be configured to receive energy detection scan requests from the channel analysis application 404 at the cloud service 208 and report energy detection scan results to the channel analysis application 404. In this configuration, periodic monitoring can be provided to a user even when the user does not have the commissioning device 210 connected to the mesh network 100.

Although aspects of distributed channel sampling across a mesh network are described as being associated with the channel manager application 402 at the commissioning device 210, and/or the channel analysis application 404 at the cloud service 208, the described functions may be distributed in any suitable fashion, including distributing some or all of these functions to other devices in the mesh network 100. For example, the border router 202 or the leader device 216 may be configured as a proxy for the commissioning device 210. The border router 202 or the leader device 216 may be configured to initiate scan request messages on behalf of the channel manager application 402 at times the commissioning device 210 is not active on the network. The border router 202 or the leader device 216 may store the scanning reports until the commissioning device 210 is once again active on the mesh network 100.

Alternatively, the border router 202 or the leader device 216 may be configured to schedule transmission of scan request messages on a periodic basis to sample RF environmental characteristics over time. For example, the border router 202 or the leader device 216 are configured to schedule scan requests at fixed intervals of time, randomized times, and/or with a schedule that scans more frequently immediately after the mesh network 100 is formed and at a reduced frequency over time.

Alternatively, the border router 202 or the leader device 216 may be configured to initiate scan request messages based on performance changes in the mesh network 100. For example, the border router 202 or the leader device 216 are configured to initiate scan requests based on a trigger condition, such as detecting that retries for packet transmissions exceed a threshold value.

Example methods 500 and 600 are described with reference to respective FIGS. 5 and 6 in accordance with one or more embodiments of the distributed channel sampling across a mesh network. Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 5:
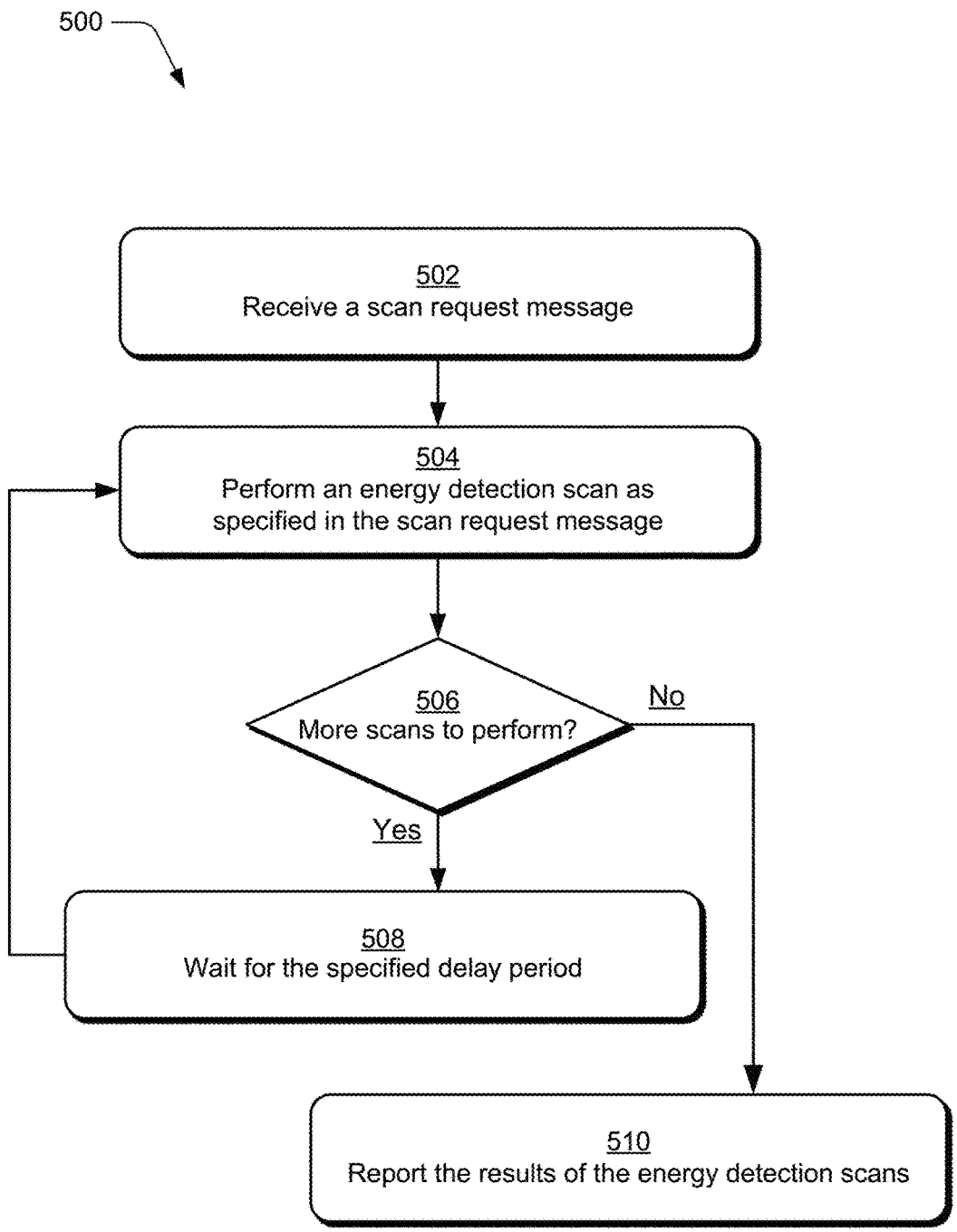
FIG. 5 illustrates an example method of distributed channel sampling across a mesh network as generally related to evaluating energy in radio channels across the mesh network in accordance with embodiments of the techniques described herein.

FIG. 5 illustrates example method(s) 500 of the distributed channel sampling across a mesh network as generally related to evaluating energy in radio channels across the mesh network. The order in which the method blocks are described are not intended to be construed as a limitation, and any number of the described method blocks can be combined in any order to implement a method, or an alternate method.

At block 502, a mesh network device receives a scan request message specifying a number of energy detection scans to perform. For example, a mesh network device receives a scan request message, over the mesh network 100 from the commissioning device 210, which includes scanning parameters for the requested energy detection scans.

At block 504, the mesh network device performs an energy detection scan as specified in the scan request message. For example, the mesh network device uses the scanning parameters in the scan request message to perform an energy detection scan. The mesh network device performs the energy detection scan on the channels indicated in a channel mask, for a specified scan duration.

At block 506, a determination is made as to whether more energy detection scans are to be performed. For example, the mesh network device determines whether more energy detection scans are to be performed based on a comparison of the number of energy detection scans that have been performed to the scan count in the scan request message.

At block 508, if there are more scans to be performed, the mesh network device waits for a delay period specified in the scan request message before performing the next energy detection scan. For example, if the mesh network device determines that there are additional energy detection scans to be performed (i.e., "Yes" from 506), then the mesh network device starts a timer based on the delay period in the scan request message and performs the next energy detection scan after the timer indicates that the delay period time has elapsed.

At block 510, if there are no more scans to be performed, the mesh network device reports the results of the energy detection scan. For example, the mesh network device determines that the number of energy detection scans specified in the scan count has been completed (i.e., "No" from 506), and the mesh network device reports the results of the energy detection scans to the commissioning device 210 in a scan result message.

Figure 6:
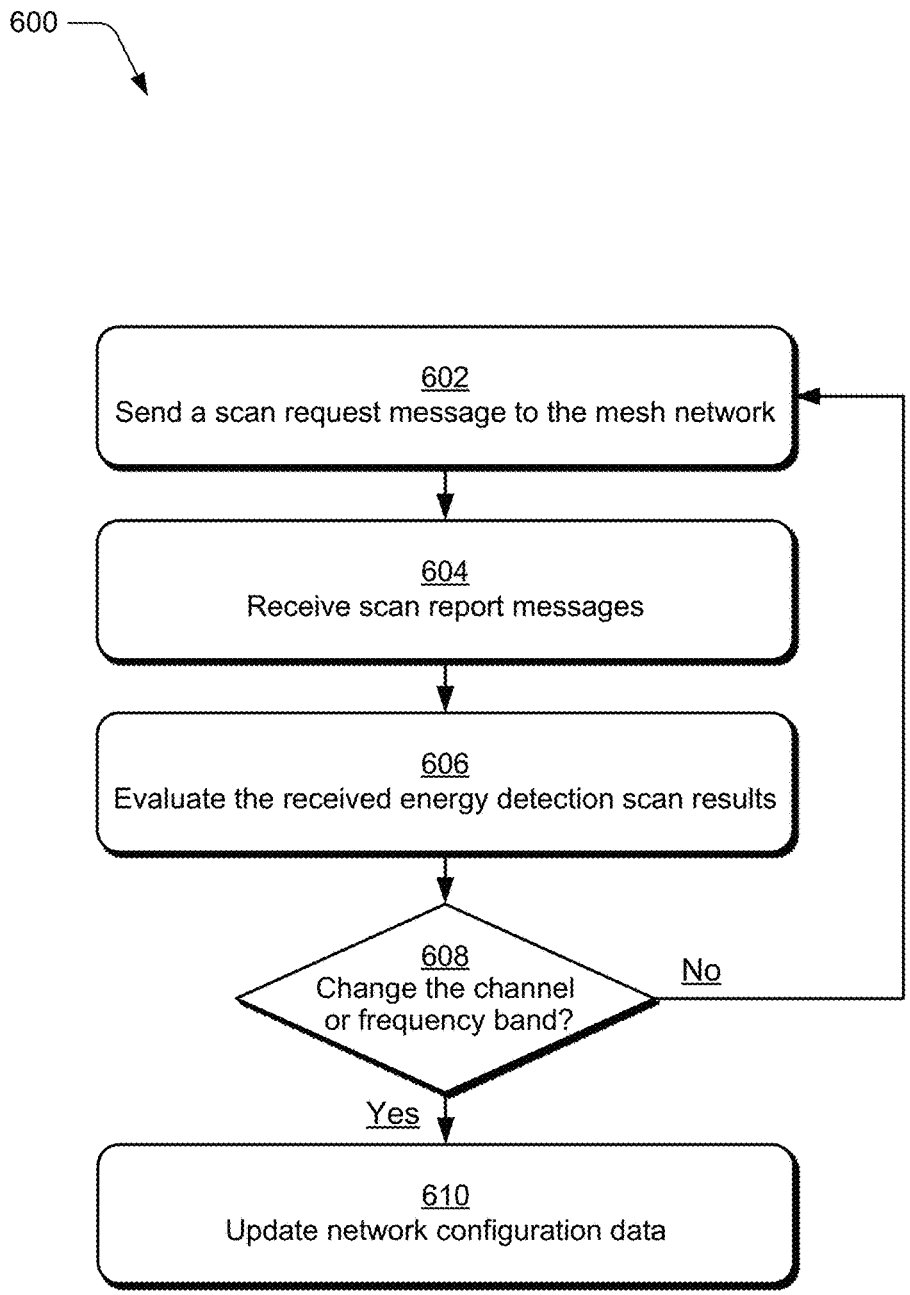
FIG. 6 illustrates another example method of distributed channel sampling across a mesh network as generally related to evaluating energy in radio channels across the mesh network in accordance with embodiments of the techniques described herein.

FIG. 6 illustrates example method(s) 600 of the distributed channel sampling across a mesh network as generally related to evaluating energy in radio channels across the mesh network. The order in which the method blocks are described are not intended to be construed as a limitation, and any number of the described method blocks can be combined in any order to implement a method, or an alternate method.

At block 602, a commissioning device sends a scan request message to mesh network devices in a mesh network. For example the channel manager application 402 sends a scan request message from the commissioning device 210 to the mesh network devices in the mesh network 100.

At block 604, the commissioning device receives scan report messages from mesh network devices in the mesh network. For example the channel manager application 402 receives scan report messages that include the results of energy detection scans performed by mesh network devices in the mesh network 100.

At block 606, the commissioning device evaluates the received energy detection scan results, and at block 608 determines whether to change the operating channel and/or frequency band of the mesh network. If the determination indicates there is no need to change the channel (i.e., "No" from 608), the commissioning device leaves the channel unchanged and sends another scan request message at a later time. For example, the channel manager application 402 evaluates the energy measurements in the received energy detection scan messages to determine if a change in the operating channel and/or frequency band would improve communication in the mesh network 100.

Optionally at block 606, the commissioning device sends the received energy detection scan results to a channel analysis application resident at a cloud service and receives a recommendation from the channel analysis application that indicates whether to change the operating channel and/or frequency band of the mesh network. For example, the channel manager application 402 sends the results of the energy detection scans over the communication network 206 to the channel analysis application 404 at the cloud service 208. The channel analysis application 404 evaluates the energy measurements in the received energy detection scan messages to determine if a change in the operating channel and/or frequency band would improve the communication in the mesh network 100. The channel analysis application 404 sends a recommendation to the channel manager application 402 over the communication network 206 indicating if a change in the operating channel and/or frequency band would improve communication in the mesh network 100.

At block 610, in response to determining to change the channel (i.e., "Yes" from 608), the commissioning device sends updated network configuration data to the leader of the mesh network to propagate the channel and/or frequency band change to the mesh network. For example, the commissioning device 210 sends updated network configuration data to the leader 216 using a management message. The leader 216 then propagates the network data, which includes the channel and/or frequency band change to the other devices in the mesh network 100.

Figure 7:
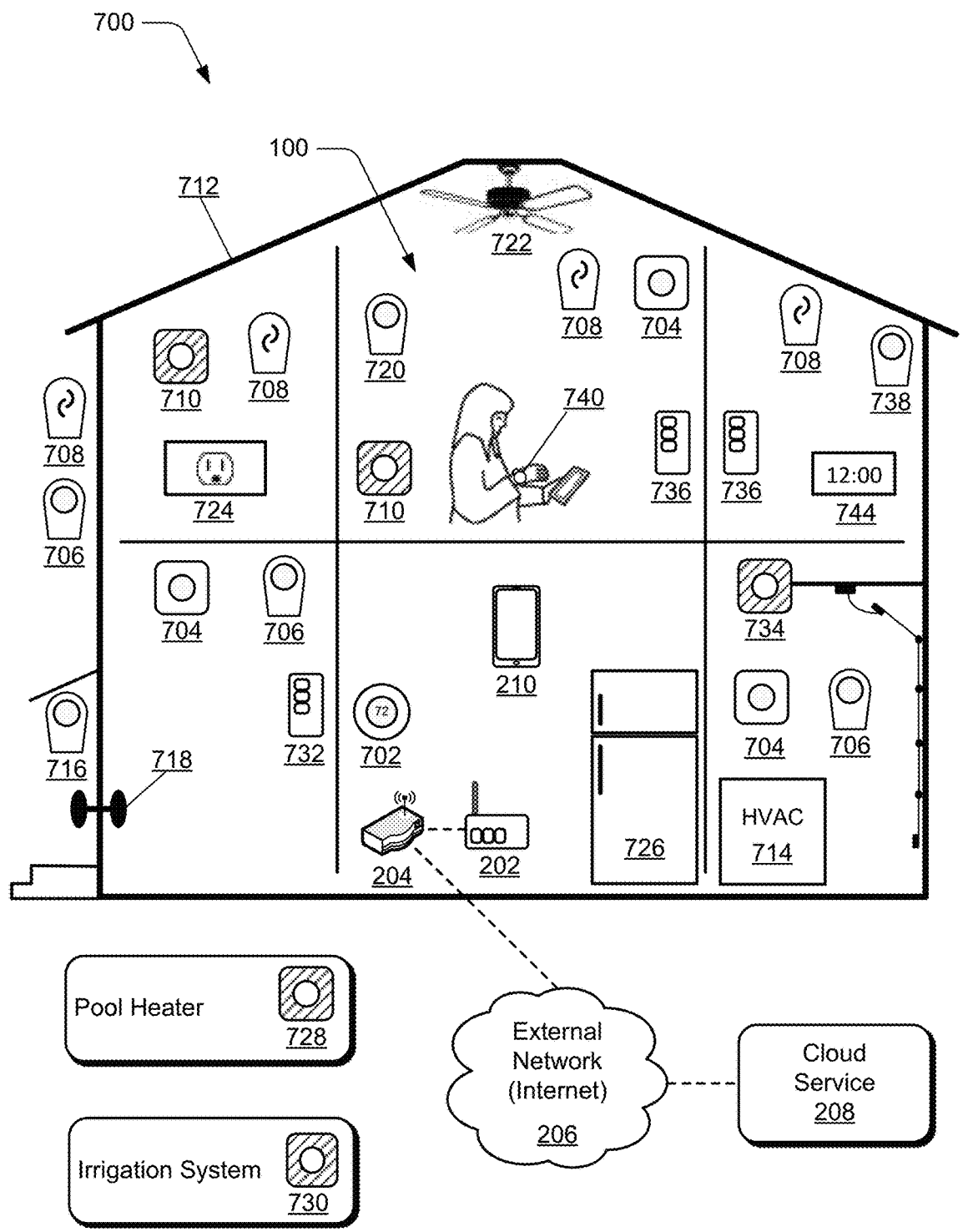
FIG. 7 illustrates an example environment in which a mesh network can be implemented in accordance with embodiments of the techniques described herein.

FIG. 7 illustrates an example environment 700 in which the mesh network 100 (as described with reference to FIG. 1), and embodiments of distributed channel sampling across a mesh network can be implemented. Generally, the environment 700 includes the mesh network 100 implemented as part of a smart-home or other type of structure with any number of mesh network devices that are configured for communication in a mesh network. For example, the mesh network devices can include a thermostat 702, hazard detectors 704 (e.g., for smoke and/or carbon monoxide), cameras 706 (e.g., indoor and outdoor), lighting units 708 (e.g., indoor and outdoor), and any other types of mesh network devices 710 that are implemented inside and/or outside of a structure 712 (e.g., in a smart-home environment). In this example, the mesh network devices can also include any of the previously described devices, such as a border router 202, a leader device 216, a commissioning device 210, as well as any of the devices implemented as a router 102, and/or an end device 106.

In the environment 700, any number of the mesh network devices can be implemented for wireless interconnection to wirelessly communicate and interact with each other. The mesh network devices are modular, intelligent, multi-sensing, network-connected devices that can integrate seamlessly with each other and/or with a central server or a cloud-computing system to provide any of a variety of useful smart-home objectives and implementations. An example of a mesh network device that can be implemented as any of the devices described herein is shown and described with reference to FIG. 8.

In implementations, the thermostat 702 may include a Nest® Learning Thermostat that detects ambient climate characteristics (e.g., temperature and/or humidity) and controls a HVAC system 714 in the smart-home environment. The learning thermostat 702 and other smart devices "learn" by capturing occupant settings to the devices. For example, the thermostat learns preferred temperature set-points for mornings and evenings, and when the occupants of the structure are asleep or awake, as well as when the occupants are typically away or at home.

A hazard detector 704 can be implemented to detect the presence of a hazardous substance or a substance indicative of a hazardous substance (e.g., smoke, fire, or carbon monoxide). In examples of wireless interconnection, a hazard detector 704 may detect the presence of smoke, indicating a fire in the structure, in which case the hazard detector that first detects the smoke can broadcast a low-power wake-up signal to all of the connected mesh network devices. The other hazard detectors 704 can then receive the broadcast wake-up signal and initiate a high-power state for hazard detection and to receive wireless communications of alert messages. Further, the lighting units 708 can receive the broadcast wake-up signal and activate in the region of the detected hazard to illuminate and identify the problem area. In another example, the lighting units 708 may activate in one illumination color to indicate a problem area or region in the structure, such as for a detected fire or break-in, and activate in a different illumination color to indicate safe regions and/or escape routes out of the structure.

In various configurations, the mesh network devices 710 can include an entryway interface device 716 that functions in coordination with a network-connected door lock system 718, and that detects and responds to a person's approach to or departure from a location, such as an outer door of the structure 712. The entryway interface device 716 can interact with the other mesh network devices based on whether someone has approached or entered the smart-home environment. An entryway interface device 716 can control doorbell functionality, announce the approach or departure of a person via audio or visual means, and control settings on a security system, such as to activate or deactivate the security system when occupants come and go. The mesh network devices 710 can also include other sensors and detectors, such as to detect ambient lighting conditions, detect room-occupancy states (e.g., with an occupancy sensor 720), and control a power and/or dim state of one or more lights. In some instances, the sensors and/or detectors may also control a power state or speed of a fan, such as a ceiling fan 722. Further, the sensors and/or detectors may detect occupancy in a room or enclosure, and control the supply of power to electrical outlets or devices 724, such as if a room or the structure is unoccupied.

The mesh network devices 710 may also include connected appliances and/or controlled systems 726, such as refrigerators, stoves and ovens, washers, dryers, air conditioners, pool heaters 728, irrigation systems 730, security systems 732, and so forth, as well as other electronic and computing devices, such as televisions, entertainment systems, computers, intercom systems, garage-door openers 734, ceiling fans 722, control panels 736, and the like. When plugged in, an appliance, device, or system can announce itself to the mesh network as described above, and can be automatically integrated with the controls and devices of the mesh network, such as in the smart-home. It should be noted that the mesh network devices 710 may include devices physically located outside of the structure, but within wireless communication range, such as a device controlling a swimming pool heater 728 or an irrigation system 730.

As described above, the mesh network 100 includes a border router 202 that interfaces for communication with an external network, outside the mesh network 100. The border router 202 connects to an access point 204, which connects to the communication network 206, such as the Internet. A cloud service 208, which is connected via the communication network 206, provides services related to and/or using the devices within the mesh network 100. By way of example, the cloud service 208 can include applications for the commissioning device 210, such as smart phones, tablets, and the like, to devices in the mesh network, processing and presenting data acquired in the mesh network 100 to end users, linking devices in one or more mesh networks 100 to user accounts of the cloud service 208, provisioning and updating devices in the mesh network 100, and so forth. For example, a user can control the thermostat 702 and other mesh network devices in the smart-home environment using a network-connected computer or portable device, such as a mobile phone or tablet device. Further, the mesh network devices can communicate information to any central server or cloud-computing system via the border router 202 and the access point 204. The data communications can be carried out using any of a variety of custom or standard wireless protocols (e.g., Wi-Fi, ZigBee for low power, 6LoWPAN, etc.) and/or by using any of a variety of custom or standard wired protocols (CAT6 Ethernet, HomePlug, etc.).

Any of the mesh network devices in the mesh network 100 can serve as low-power and communication nodes to create the mesh network 100 in the smart-home environment. Individual low-power nodes of the network can regularly send out messages regarding what they are sensing, and the other low-powered nodes in the environment—in addition to sending out their own messages—can repeat the messages, thereby communicating the messages from node to node (i.e., from device to device) throughout the mesh network. The mesh network devices can be implemented to conserve power, particularly when battery-powered, utilizing low-powered communication protocols to receive the messages, translate the messages to other communication protocols, and send the translated messages to other nodes and/or to a central server or cloud-computing system. For example, an occupancy and/or ambient light sensor can detect an occupant in a room as well as measure the ambient light, and activate the light source when the ambient light sensor 738 detects that the room is dark and when the occupancy sensor 720 detects that someone is in the room. Further, the sensor can include a low-power wireless communication chip (e.g., a ZigBee chip) that regularly sends out messages regarding the occupancy of the room and the amount of light in the room, including instantaneous messages coincident with the occupancy sensor detecting the presence of a person in the room. As mentioned above, these messages may be sent wirelessly, using the mesh network, from node to node (i.e., smart device to smart device) within the smart-home environment as well as over the Internet to a central server or cloud-computing system.

In other configurations, various ones of the mesh network devices can function as "tripwires" for an alarm system in the smart-home environment. For example, in the event a perpetrator circumvents detection by alarm sensors located at windows, doors, and other entry points of the structure or environment, the alarm could still be triggered by receiving an occupancy, motion, heat, sound, etc. message from one or more of the low-powered mesh nodes in the mesh network. In other implementations, the mesh network can be used to automatically turn on and off the lighting units 708 as a person transitions from room to room in the structure. For example, the mesh network devices can detect the person's movement through the structure and communicate corresponding messages via the nodes of the mesh network. Using the messages that indicate which rooms are occupied, other mesh network devices that receive the messages can activate and/or deactivate accordingly. As referred to above, the mesh network can also be utilized to provide exit lighting in the event of an emergency, such as by turning on the appropriate lighting units 708 that lead to a safe exit. The light units 708 may also be turned-on to indicate the direction along an exit route that a person should travel to safely exit the structure.

The various mesh network devices may also be implemented to integrate and communicate with wearable computing devices 740, such as may be used to identify and locate an occupant of the structure, and adjust the temperature, lighting, sound system, and the like accordingly. In other implementations, RFID sensing (e.g., a person having an RFID bracelet, necklace, or key fob), synthetic vision techniques (e.g., video cameras and face recognition processors), audio techniques (e.g., voice, sound pattern, vibration pattern recognition), ultrasound sensing/imaging techniques, and infrared or near-field communication (NFC) techniques (e.g., a person wearing an infrared or NFC-capable smartphone), along with rules-based inference engines or artificial intelligence techniques that draw useful conclusions from the sensed information as to the location of an occupant in the structure or environment.

In other implementations, personal comfort-area networks, personal health-area networks, personal safety-area networks, and/or other such human-facing functionalities of service robots can be enhanced by logical integration with other mesh network devices and sensors in the environment according to rules-based inferencing techniques or artificial intelligence techniques for achieving better performance of these functionalities. In an example relating to a personal health-area, the system can detect whether a household pet is moving toward the current location of an occupant (e.g., using any of the mesh network devices and sensors), along with rules-based inferencing and artificial intelligence techniques. Similarly, a hazard detector service robot can be notified that the temperature and humidity levels are rising in a kitchen, and temporarily raise a hazard detection threshold, such as a smoke detection threshold, under an inference that any small increases in ambient smoke levels will most likely be due to cooking activity and not due to a genuinely hazardous condition. Any service robot that is configured for any type of monitoring, detecting, and/or servicing can be implemented as a mesh node device on the mesh network, conforming to the wireless interconnection protocols for communicating on the mesh network.

The mesh network devices 710 may also include a smart alarm clock 744 for each of the individual occupants of the structure in the smart-home environment. For example, an occupant can customize and set an alarm device for a wake time, such as for the next day or week. Artificial intelligence can be used to consider occupant responses to the alarms when they go off and make inferences about preferred sleep patterns over time. An individual occupant can then be tracked in the mesh network based on a unique signature of the person, which is determined based on data obtained from sensors located in the mesh network devices, such as sensors that include ultrasonic sensors, passive IR sensors, and the like. The unique signature of an occupant can be based on a combination of patterns of movement, voice, height, size, etc., as well as using facial recognition techniques.

In an example of wireless interconnection, the wake time for an individual can be associated with the thermostat 702 to control the HVAC system in an efficient manner so as to pre-heat or cool the structure to desired sleeping and awake temperature settings. The preferred settings can be learned over time, such as by capturing the temperatures set in the thermostat before the person goes to sleep and upon waking up. Collected data may also include biometric indications of a person, such as breathing patterns, heart rate, movement, etc., from which inferences are made based on this data in combination with data that indicates when the person actually wakes up. Other mesh network devices can use the data to provide other smart-home objectives, such as adjusting the thermostat 702 so as to pre-heat or cool the environment to a desired setting, and turning-on or turning-off the lights 708.

In implementations, the mesh network devices can also be utilized for sound, vibration, and/or motion sensing such as to detect running water and determine inferences about water usage in a smart-home environment based on algorithms and mapping of the water usage and consumption. This can be used to determine a signature or fingerprint of each water source in the home, and is also referred to as "audio fingerprinting water usage." Similarly, the mesh network devices can be utilized to detect the subtle sound, vibration, and/or motion of unwanted pests, such as mice and other rodents, as well as by termites, cockroaches, and other insects. The system can then notify an occupant of the suspected pests in the environment, such as with warning messages to help facilitate early detection and prevention.

Figure 8:
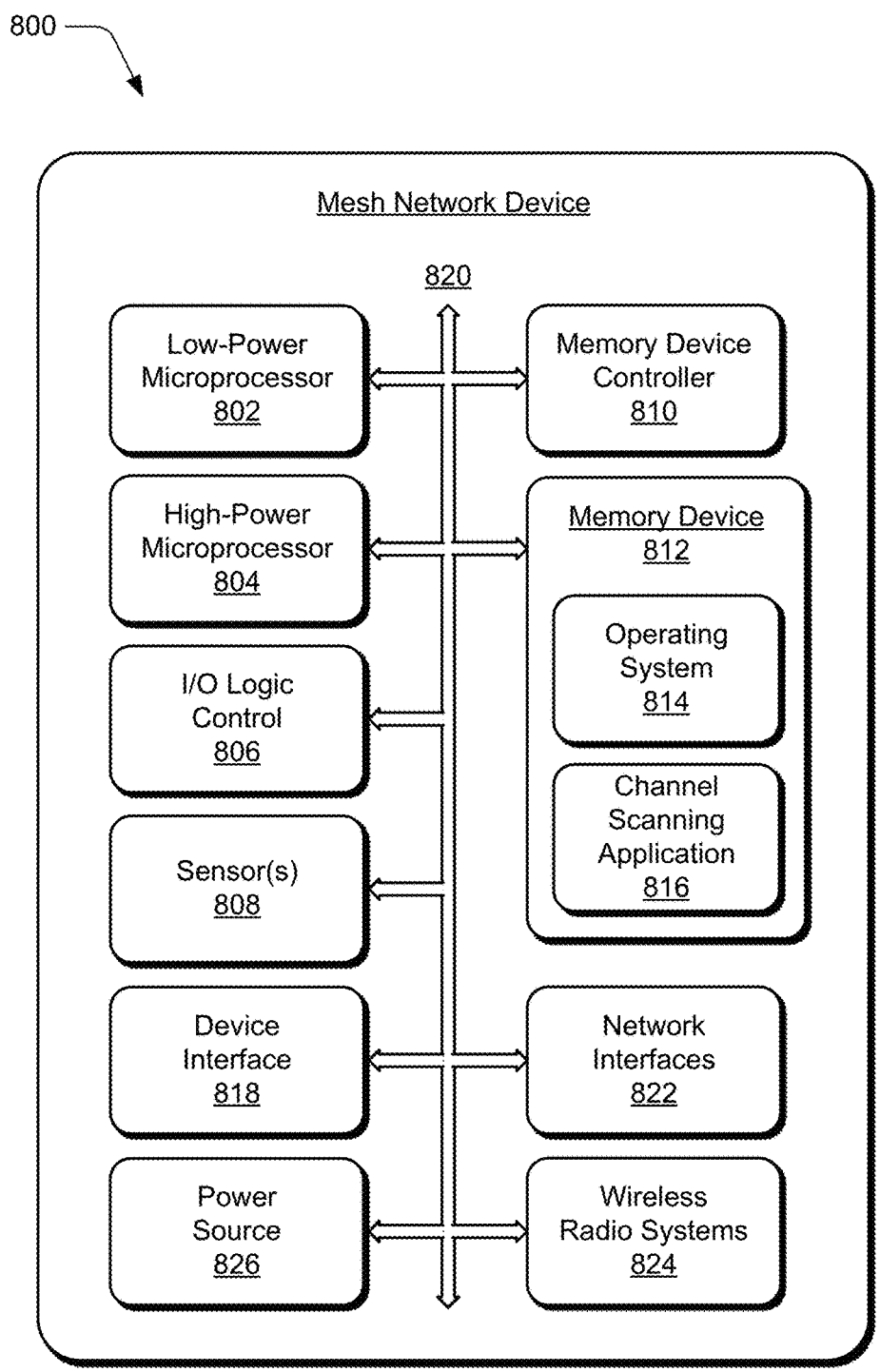
FIG. 8 illustrates an example mesh network device that can be implemented in a mesh network environment in accordance with one or more embodiments of the techniques described herein.

FIG. 8 illustrates an example mesh network device 800 that can be implemented as any of the mesh network devices in a mesh network in accordance with one or more embodiments of distributed channel sampling across a mesh network as described herein. The device 800 can be integrated with electronic circuitry, microprocessors, memory, input output (I/O) logic control, communication interfaces and components, as well as other hardware, firmware, and/or software to implement the device in a mesh network. Further, the mesh network device 800 can be implemented with various components, such as with any number and combination of different components as further described with reference to the example device shown in FIG. 9.

In this example, the mesh network device 800 includes a low-power microprocessor 802 and a high-power microprocessor 804 (e.g., microcontrollers or digital signal processors) that process executable instructions. The device also includes an input-output (I/O) logic control 806 (e.g., to include electronic circuitry). The microprocessors can include components of an integrated circuit, programmable logic device, a logic device formed using one or more semiconductors, and other implementations in silicon and/or hardware, such as a processor and memory system implemented as a system-on-chip (SoC). Alternatively or in addition, the device can be implemented with any one or combination of software, hardware, firmware, or fixed logic circuitry that may be implemented with processing and control circuits. The low-power microprocessor 802 and the high-power microprocessor 804 can also support one or more different device functionalities of the device. For example, the high-power microprocessor 804 may execute computationally intensive operations, whereas the low-power microprocessor 802 may manage less complex processes such as detecting a hazard or temperature from one or more sensors 808. The low-power processor 802 may also wake or initialize the high-power processor 804 for computationally intensive processes.

The one or more sensors 808 can be implemented to detect various properties such as acceleration, temperature, humidity, water, supplied power, proximity, external motion, device motion, sound signals, ultrasound signals, light signals, fire, smoke, carbon monoxide, global-positioning-satellite (GPS) signals, radio-frequency (RF), other electromagnetic signals or fields, or the like. As such, the sensors 808 may include any one or a combination of temperature sensors, humidity sensors, hazard-related sensors, other environmental sensors, accelerometers, microphones, optical sensors up to and including cameras (e.g., charged coupled-device or video cameras, active or passive radiation sensors, GPS receivers, and radio frequency identification detectors. In implementations, the mesh network device 800 may include one or more primary sensors, as well as one or more secondary sensors, such as primary sensors that sense data central to the core operation of the device (e.g., sensing a temperature in a thermostat or sensing smoke in a smoke detector), while the secondary sensors may sense other types of data (e.g., motion, light or sound), which can be used for energy-efficiency objectives or smart-operation objectives.

The mesh network device 800 includes a memory device controller 810 and a memory device 812, such as any type of a nonvolatile memory and/or other suitable electronic data storage device. The mesh network device 800 can also include various firmware and/or software, such as an operating system 814 that is maintained as computer executable instructions by the memory and executed by a microprocessor. The device software may also include a channel scanning application 816 that implements embodiments of distributed channel sampling across a mesh network. The mesh network device 800 also includes a device interface 818 to interface with another device or peripheral component, and includes an integrated data bus 820 that couples the various components of the mesh network device for data communication between the components. The data bus in the mesh network device may also be implemented as any one or a combination of different bus structures and/or bus architectures.

The device interface 818 may receive input from a user and/or provide information to the user (e.g., as a user interface), and a received input can be used to determine a setting. The device interface 818 may also include mechanical or virtual components that respond to a user input. For example, the user can mechanically move a sliding or rotatable component, or the motion along a touchpad may be detected, and such motions may correspond to a setting adjustment of the device. Physical and virtual movable user-interface components can allow the user to set a setting along a portion of an apparent continuum. The device interface 818 may also receive inputs from any number of peripherals, such as buttons, a keypad, a switch, a microphone, and an imager (e.g., a camera device).

The mesh network device 800 can include network interfaces 822, such as a mesh network interface for communication with other mesh network devices in a mesh network, and an external network interface for network communication, such as via the Internet. The mesh network device 800 also includes wireless radio systems 824 for wireless communication with other mesh network devices via the mesh network interface and for multiple, different wireless communications systems. The wireless radio systems 824 may include Wi-Fi, Bluetooth™, Mobile Broadband, and/or point-to-point IEEE 802.15.4. Each of the different radio systems can include a radio device, antenna, and chipset that is implemented for a particular wireless communications technology. The mesh network device 800 also includes a power source 826, such as a battery and/or to connect the device to line voltage. An AC power source may also be used to charge the battery of the device.

Figure 9:
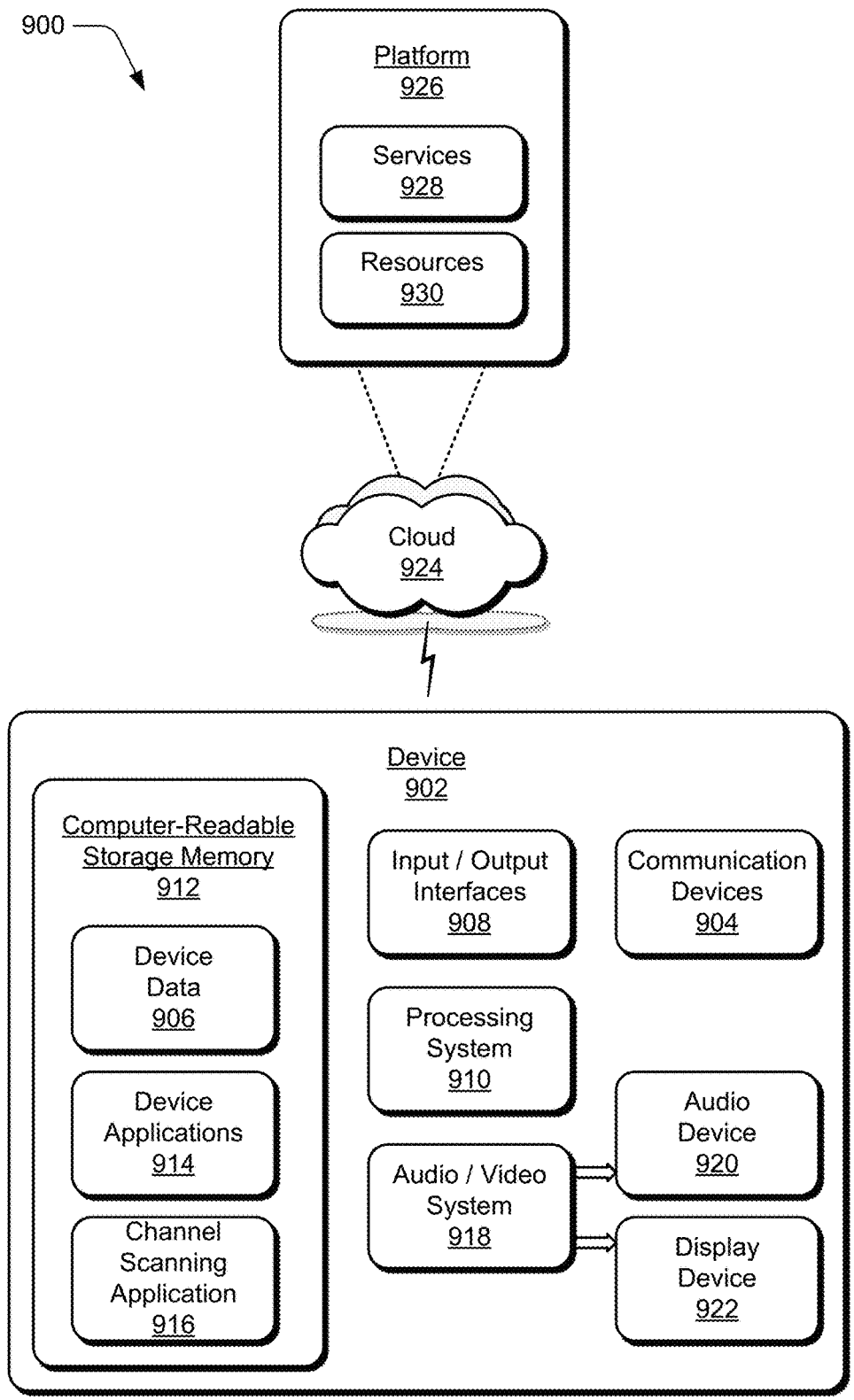
FIG. 9 illustrates an example system with an example device that can implement embodiments of distributed channel sampling across a mesh network.

FIG. 9 illustrates an example system 900 that includes an example device 902, which can be implemented as any of the mesh network devices that implement embodiments of distributed channel sampling across a mesh network as described with reference to the previous FIGS. 1-8. The example device 902 may be any type of computing device, client device, mobile phone, tablet, communication, entertainment, gaming, media playback, and/or other type of device. Further, the example device 902 may be implemented as any other type of mesh network device that is configured for communication on a mesh network, such as a thermostat, hazard detector, camera, light unit, commissioning device, router, border router, joiner router, joining device, end device, leader, access point, and/or other mesh network devices.

The device 902 includes communication devices 904 that enable wired and/or wireless communication of device data 906, such as data that is communicated between the devices in a mesh network, data that is being received, data scheduled for broadcast, data packets of the data, data that is synched between the devices, etc. The device data can include any type of communication data, as well as audio, video, and/or image data that is generated by applications executing on the device. The communication devices 904 can also include transceivers for cellular phone communication and/or for network data communication.

The device 902 also includes input/output (I/O) interfaces 908, such as data network interfaces that provide connection and/or communication links between the device, data networks (e.g., a mesh network, external network, etc.), and other devices. The I/O interfaces can be used to couple the device to any type of components, peripherals, and/or accessory devices. The I/O interfaces also include data input ports via which any type of data, media content, and/or inputs can be received, such as user inputs to the device, as well as any type of communication data, as well as audio, video, and/or image data received from any content and/or data source.

The device 902 includes a processing system 910 that may be implemented at least partially in hardware, such as with any type of microprocessors, controllers, and the like that process executable instructions. The processing system can include components of an integrated circuit, programmable logic device, a logic device formed using one or more semiconductors, and other implementations in silicon and/or hardware, such as a processor and memory system implemented as a system-on-chip (SoC). Alternatively or in addition, the device can be implemented with any one or combination of software, hardware, firmware, or fixed logic circuitry that may be implemented with processing and control circuits. The device 902 may further include any type of a system bus or other data and command transfer system that couples the various components within the device. A system bus can include any one or combination of different bus structures and architectures, as well as control and data lines.

The device 902 also includes computer-readable storage memory 912, such as data storage devices that can be accessed by a computing device, and that provide persistent storage of data and executable instructions (e.g., software applications, modules, programs, functions, and the like). The computer-readable storage memory described herein excludes propagating signals. Examples of computer-readable storage memory include volatile memory and non-volatile memory, fixed and removable media devices, and any suitable memory device or electronic data storage that maintains data for computing device access. The computer-readable storage memory can include various implementations of random access memory (RAM), read-only memory (ROM), flash memory, and other types of storage memory in various memory device configurations.

The computer-readable storage memory 912 provides storage of the device data 906 and various device applications 914, such as an operating system that is maintained as a software application with the computer-readable storage memory and executed by the processing system 910. The device applications may also include a device manager, such as any form of a control application, software application, signal processing and control module, code that is native to a particular device, a hardware abstraction layer for a particular device, and so on. In this example, the device applications also include a channel scanning application 916 that implements embodiments of distributed channel sampling across a mesh network, such as when the example device 902 is implemented as any of the mesh network devices described herein.

The device 902 also includes an audio and/or video system 918 that generates audio data for an audio device 920 and/or generates display data for a display device 922. The audio device and/or the display device include any devices that process, display, and/or otherwise render audio, video, display, and/or image data, such as the image content of a digital photo. In implementations, the audio device and/or the display device are integrated components of the example device 902. Alternatively, the audio device and/or the display device are external, peripheral components to the example device. In embodiments, at least part of the techniques described for distributed channel sampling across a mesh network may be implemented in a distributed system, such as over a "cloud" 924 in a platform 926. The cloud 924 includes and/or is representative of the platform 926 for services 928 and/or resources 930.

The platform 926 abstracts underlying functionality of hardware, such as server devices (e.g., included in the services 928) and/or software resources (e.g., included as the resources 930), and connects the example device 902 with other devices, servers, etc. The resources 930 may also include applications and/or data that can be utilized while computer processing is executed on servers that are remote from the example device 902. Additionally, the services 928 and/or the resources 930 may facilitate subscriber network services, such as over the Internet, a cellular network, or Wi-Fi network. The platform 926 may also serve to abstract and scale resources to service a demand for the resources 930 that are implemented via the platform, such as in an interconnected device embodiment with functionality distributed throughout the system 900. For example, the functionality may be implemented in part at the example device 902 as well as via the platform 926 that abstracts the functionality of the cloud 924.

Although embodiments of distributed channel sampling across a mesh network have been described in language specific to features and/or methods, the subject of the appended claims is not necessarily limited to the specific features or methods described. Rather, the specific features and methods are disclosed as example implementations of distributed channel sampling across a mesh network, and other equivalent features and methods are intended to be within the scope of the appended claims. Further, various different embodiments are described and it is to be appreciated that each described embodiment can be implemented independently or in connection with one or more other described embodiments.

The invention claimed is:

1. A method of configuring a mesh network for distributed channel scanning, the method comprising:
propagating a scanning request, including scanning parameters, to nodes in the mesh network, causing the nodes to perform energy detection scans using the scanning parameters, the scanning parameters comprising one or more of:
a channel mask comprising an indication of one or more channels to scan,
a scan count indicating a number of scans to perform,
a scan duration indicating an amount of time for an energy measurement, and
a delay period between each channel scan;
receiving one or more scanning reports comprising energy measurements from the energy detection scans of the mesh network nodes;
analyzing the received energy measurements to determine an operating channel for the mesh network; and
sending network configuration information, comprising the determined operating channel, to a leader device in the mesh network, causing the leader device to propagate the network configuration information to the mesh network.

2. The method of claim 1, wherein said analyzing the received energy measurements comprises:
sending the received energy measurements over a communication network to a channel analysis service; and
receiving a recommendation comprising the operating channel from the channel analysis service.

3. The method of claim 2, wherein the scanning parameters include an address of the channel analysis service, and wherein the scanning reports are sent to channel analysis service using the included address.

4. The method of claim 1, wherein said analyzing the received energy measurements comprises:
comparing the received energy measurements to energy measurements from one or more previous scanning requests.

5. The method of claim 1, further comprising:
querying a channel pages identifier in one or more of the nodes of the mesh network to determine the scanning parameters.

6. The method of claim 5, wherein the channels in the channel pages identifier include channels in multiple frequency bands, and wherein the determined operating channel is in a frequency band other than a current frequency band.

7. A mesh network device, comprising:
a mesh network interface configured for communication in a mesh network;
a memory and processor system to implement a channel scanning application that is configured to:
receive a scanning request including scanning parameters that comprise one or more of:
a channel mask comprising an indication of one or more channels to scan,
a scan count indicating a number of scans to perform,
a scan duration indicating an amount of time for an energy measurement, and
a delay period between each channel scan;
configure the mesh network interface to perform an energy detection scan according to the received scanning parameters;
transmit a scanning report including energy measurements from the scan.

8. The mesh network device of claim 7, wherein the channel scanning application is configured to:
determine if there is an active commissioner on the mesh network; and
in response to determining that there is no active commissioner, terminate performing the energy detection scan.

9. The mesh network device of claim 7, wherein the channel scanning application is configured to:
perform an energy measurement on each of the indicated channels in the channel mask.

10. The mesh network device of claim 7, wherein the channel scanning application is configured to:
perform the number of the energy detection scans indicated by the scan count.

11. The mesh network device of claim 10, wherein the channel scanning application is configured to:
determine that a number of the energy detection scans performed is less than the scan count;
wait a time duration indicated by the delay period; and
perform another energy detection scan.

12. The mesh network device of claim 7, wherein the channel scanning application configured to:
perform each one of the energy detection scans for a time duration indicated by the scan duration.

13. The mesh network device of claim 7, wherein the channel scanning application is configured to:
perform each one of the energy detection scans after a time duration indicated by the delay period.

14. A mesh network system, comprising:
one or more mesh network nodes configured to perform channel scans; and
a commissioning device on the mesh network, the commissioning device configured to:
propagate a scanning request, including scanning parameters, to the one or more mesh network nodes in the mesh network, causing the nodes to perform energy detection scans using the scanning parameters that comprise one or more of:
a channel mask comprising an indication of one or more channels to scan,
a scan count indicating a number of scans to perform,
a scan duration indicating an amount of time for an energy measurement, and
a delay period between each channel scan;
receive one or more scanning reports comprising energy measurements from the energy detection scans of the one or more mesh network nodes;
analyze the received energy measurements to determine an operating channel for the mesh network; and
send network configuration information comprising the determined operating channel to a leader device in the mesh network, causing the leader device to propagate the network configuration information to the mesh network.

15. The mesh network system of claim 14, wherein the commissioning device is configured to:
send the received energy measurements over a communication network to a channel analysis service; and
receive a recommendation comprising the operating channel from the channel analysis service.

16. The mesh network system of claim 15, wherein the channel analysis service is configured to:
store energy measurements from previous scan requests; and
compare the received energy measurements to energy measurements from the previous scanning requests to determine the operating channel.

17. The mesh network system of claim 15, wherein the channel analysis service is configured to:
receive energy measurements from multiple other mesh networks;
aggregate results of channel scans from the other mesh networks; and
determine an operating channel based on the aggregated results and the received energy measurements.

18. The mesh network system of claim 14, wherein the commissioning device is configured to:
query a channel pages identifier in one or more of the mesh network nodes to determine the scanning parameters.

19. The mesh network system of claim 18, wherein the channels in the channel pages identifier include channels in multiple frequency bands, and wherein the determined operating channel is in a frequency band other than a current frequency band.

20. A method of configuring a mesh network for distributed channel scanning, the method comprising:
propagating a scanning request, including scanning parameters, to nodes in the mesh network, causing the nodes to perform energy detection scans using the scanning parameters, the scanning parameters including an address of a channel analysis service;
receiving one or more scanning reports comprising energy measurements from the energy detection scans of the mesh network nodes;
analyzing the received energy measurements to determine an operating channel for the mesh network by:
sending the received energy measurements over a communication network to the channel analysis service using the included address; and
receiving a recommendation comprising the operating channel from the channel analysis service; and
sending network configuration information, comprising the determined operating channel, to a leader device in the mesh network, causing the leader device to propagate the network configuration information to the mesh network.

21. The method of claim 20, wherein the channel analysis service is configured to:
store energy measurements from previous scan requests; and
compare the received energy measurements to energy measurements from the previous scanning requests to determine the operating channel.

22. The method of claim 20, wherein the channel analysis service is configured to:
receive energy measurements from multiple other mesh networks;
aggregate results of channel scans from the other mesh networks; and
determine an operating channel based on the aggregated results and the received energy measurements.

23. The method of claim 20, wherein the scanning parameters comprise one or more of:
a channel mask comprising an indication of one or more channels to scan;
a scan count indicating a number of scans to perform;
a scan duration indicating an amount of time for an energy measurement; and
a delay period between each channel scan.

24. A mesh network system, comprising:
one or more mesh network nodes configured to perform channel scans; and
a commissioning device on the mesh network, the commissioning device configured to:
propagate a scanning request, including scanning parameters, to the one or more mesh network nodes in the mesh network, causing the nodes to perform energy detection scans using the scanning parameters;
receive one or more scanning reports comprising energy measurements from the energy detection scans of the one or more mesh network nodes;
analyze the received energy measurements to determine an operating channel for the mesh network, the analysis comprises:
send the received energy measurements over a communication network to a channel analysis service; and
receive a recommendation comprising the operating channel from the channel analysis service; and
send network configuration information comprising the determined operating channel to a leader device in the mesh network, causing the leader device to propagate the network configuration information to the mesh network;
the channel analysis service configured to:
receive energy measurements from multiple other mesh networks;
aggregate results of channel scans from the other mesh networks; and
determine an operating channel based on the aggregated results and the received energy measurements.

25. The mesh network system of claim 24, wherein the channel analysis service is configured to:
store energy measurements from previous scan requests; and
compare the received energy measurements to energy measurements from the previous scanning requests to determine the operating channel.

26. The mesh network system of claim 24, wherein the scanning parameters comprise one or more of:
a channel mask comprising an indication of one or more channels to scan;
a scan count indicating a number of scans to perform;
a scan duration indicating an amount of time for an energy measurement; and
a delay period between each channel scan.

27. The mesh network system of claim 24, wherein the commissioning device is configured to:
query a channel pages identifier in one or more of the mesh network nodes to determine the scanning parameters.

28. The mesh network system of claim 27, wherein the channels in the channel pages identifier include channels in multiple frequency bands, and wherein the determined operating channel is in a frequency band other than a current frequency band.

* * * * *